US012421857B2

(12) United States Patent
Degel et al.

(10) Patent No.: US 12,421,857 B2
(45) Date of Patent: Sep. 23, 2025

(54) BILAYER THERMAL BARRIER COATINGS WITH AN ADVANCED INTERFACE

(71) Applicant: Siemens Energy Global GmbH & Co. KG, Bayern (DE)

(72) Inventors: Christopher Degel, Berlin (DE); Roy Patgunarajah, Berlin (DE); Dimitrios Zois, Fort Mill, SC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 193 days.

(21) Appl. No.: 18/033,099

(22) PCT Filed: Oct. 5, 2021

(86) PCT No.: PCT/EP2021/077439
§ 371 (c)(1),
(2) Date: Apr. 21, 2023

(87) PCT Pub. No.: WO2022/096211
PCT Pub. Date: May 12, 2022

(65) Prior Publication Data

US 2023/0383393 A1 Nov. 30, 2023

(30) Foreign Application Priority Data

Nov. 4, 2020 (EP) .................................... 20205571

(51) Int. Cl.
*C23C 4/10* (2016.01)
*C23C 4/02* (2006.01)
(Continued)

(52) U.S. Cl.
CPC ................ *F01D 5/288* (2013.01); *C23C 4/02* (2013.01); *C23C 4/10* (2013.01); *C23C 28/042* (2013.01);
(Continued)

(58) Field of Classification Search
CPC ..... C04B 41/52; C04B 41/524; C04B 41/526; C04B 41/89; F01D 5/288; F05D 2230/90;
(Continued)

(56) References Cited

U.S. PATENT DOCUMENTS 5,223,045 A * 6/1993 Priceman ................ F01D 5/288 148/279
5,419,971 A * 5/1995 Skelly ....................... C23C 4/02 428/164
(Continued)

FOREIGN PATENT DOCUMENTS

EP 3438325 A1 2/2019
WO 2015080804 A1 6/2015

OTHER PUBLICATIONS

PCT International Search Report and Written Opinion of International Searching Authority mailed Jan. 3, 2022 corresponding to PCT International Application No. PCT/EP2021 /077439 filed Oct. 5, 2021.

*Primary Examiner* — Z. Jim Yang
(74) *Attorney, Agent, or Firm* — Wolter Van Dyke Davis, PLLC

(57) ABSTRACT

A component with a ceramic coating system wherein the component includes a substrate, especially a nickel- or cobalt-based superalloy, a metallic bond coat, especially based on a NiCoCrAl composition, a ceramic coating system with an lower ceramic coating and an upper ceramic coating. An intermediate coating is located between lower coating and upper coating, providing a rougher surface which has a maximum thickness of 25% of the thickness of the lower coating or of the upper coating. The bonding capacity of a ceramic coating system is improved by adapting the coating parameters such as size of the powder and changing of the parameters of the spraying system.

19 Claims, 1 Drawing Sheet

(51) Int. Cl.
*C23C 28/04* (2006.01)
*F01D 5/28* (2006.01)

(52) U.S. Cl.
CPC .... *C23C 28/048* (2013.01); *F05D 2300/2118* (2013.01); *F05D 2300/516* (2013.01)

(58) Field of Classification Search
CPC ....... F05D 2230/611; F05D 2230/6111; C23C 28/04; C23C 28/042; C23C 28/048; C23C 28/30; C23C 28/34; C23C 28/345; C23C 28/3455; C23C 4/04; C23C 4/10; C23C 4/11; C23C 4/12–137
See application file for complete search history.

(56) References Cited

U.S. PATENT DOCUMENTS

| | | | | | |
|---|---|---|---|---|---|
| 5,863,668 | A * | 1/1999 | Brindley | C23C 28/3225 | 428/678 |
| 6,102,656 | A * | 8/2000 | Nissley | F01D 5/288 | 415/174.4 |
| 2003/0180571 | A1* | 9/2003 | Singh | C23C 28/3455 | 427/596 |
| 2005/0170200 | A1 | 8/2005 | Nagaraj | | |
| 2005/0282020 | A1* | 12/2005 | Stowell | C23C 28/3215 | 427/446 |
| 2007/0026159 | A1* | 2/2007 | Deem | H01J 37/32871 | 427/446 |
| 2008/0107920 | A1* | 5/2008 | Rowe | C23C 28/345 | 428/701 |
| 2008/0145643 | A1* | 6/2008 | Reynolds | C23C 24/06 | 427/261 |
| 2008/0160269 | A1* | 7/2008 | Stamm | C23C 28/022 | 428/212 |
| 2009/0053554 | A1* | 2/2009 | Strock | C23C 4/02 | 427/446 |
| 2010/0136349 | A1* | 6/2010 | Lee | C04B 41/52 | 428/411.1 |
| 2010/0247953 | A1* | 9/2010 | Bossmann | C04B 37/005 | 156/60 |
| 2011/0014060 | A1* | 1/2011 | Bolcavage | F01D 5/288 | 29/889.7 |
| 2011/0033284 | A1* | 2/2011 | Tryon | C23C 28/04 | 427/454 |
| 2012/0087781 | A1* | 4/2012 | Metscher | F01D 5/288 | 415/174.4 |
| 2012/0276352 | A1* | 11/2012 | Liu | F01D 5/288 | 428/312.8 |
| 2013/0052415 | A1* | 2/2013 | Burns | C04B 35/62222 | 977/773 |
| 2013/0095256 | A1* | 4/2013 | Hass | C23C 14/228 | 427/596 |
| 2013/0122259 | A1* | 5/2013 | Lee | C23C 28/048 | 428/164 |
| 2013/0129938 | A1* | 5/2013 | Hass | C23C 14/027 | 427/569 |
| 2013/0157000 | A1* | 6/2013 | Roth-Fagaraseanu | B32B 3/263 | 428/116 |
| 2013/0224453 | A1* | 8/2013 | Hazel | C23C 4/18 | 427/454 |
| 2014/0162027 | A1* | 6/2014 | Meschter | C04B 41/009 | 427/258 |
| 2015/0147524 | A1 | 5/2015 | Petorak | | |
| 2015/0197456 | A1* | 7/2015 | Oboodi | C04B 41/009 | 427/446 |
| 2016/0362989 | A1* | 12/2016 | Subramanian | C23C 4/12 | |
| 2016/0369637 | A1* | 12/2016 | Subramanian | F01D 5/288 | |
| 2016/0375637 | A1* | 12/2016 | Terada | B22F 12/00 | 428/141 |
| 2017/0096902 | A1* | 4/2017 | Novovic | C25D 5/50 | |
| 2017/0101709 | A1* | 4/2017 | Neal | F01D 25/28 | |
| 2017/0122561 | A1* | 5/2017 | Nagaraj | F02C 7/24 | |
| 2017/0275747 | A1* | 9/2017 | Antolino | C23C 4/02 | |
| 2018/0066527 | A1* | 3/2018 | Kadau | F01D 11/122 | |
| 2019/0032189 | A1* | 1/2019 | Chen | C23C 4/134 | |
| 2019/0101020 | A1* | 4/2019 | Hugot | C23C 28/36 | |
| 2021/0131305 | A1* | 5/2021 | Keshavan | C23C 28/3215 | |
| 2022/0112611 | A1* | 4/2022 | Lutz | C23C 4/073 | |
| 2022/0341335 | A1* | 10/2022 | Gong | F01D 5/288 | |

* cited by examiner

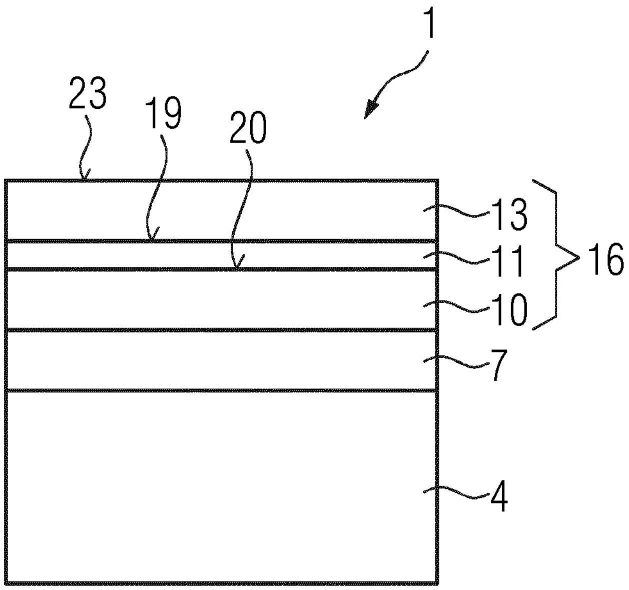
1
23
19
20
13
11
16
10
7
4

BILAYER THERMAL BARRIER COATINGS WITH AN ADVANCED INTERFACE

CROSS REFERENCE TO RELATED APPLICATIONS

This application is the US National Stage of International Application No. PCT/EP2021/077439 filed 5 Oct. 2021, and claims the benefit thereof. The International Application claims the benefit of European Application No. EP20205571 filed 4 Nov. 2020. All of the applications are incorporated by reference herein in their entirety.

FIELD OF INVENTION

The invention relates to a component with a ceramic coating system which reveals a two layered ceramic coating system.

BACKGROUND OF INVENTION

The ever increasing Turbine Inlet Temperatures (TIT) have led to the introduction of advanced Thermal Barrier Coatings (TBC), that typically appear as multilayer ceramic systems. These TBC typically comprise a partially high fracture toughness partially stabilized zirconia lower coating and one or multiple lower fracture ceramic upper coating.

A very typical ceramic coating is a fully stabilized zirconia thermal barrier coating, which typically shows low fracture toughness, sintering resistance and phase stability at high temperatures.

However, fully stabilized coatings are characterized by low fracture toughness and thus low erosion resistance and are deposited on top of partially stabilized zirconia coatings, bonded by a ceramic-ceramic interface, that can be rather weak and can lead to complete delamination of the upper coating, with adverse consequences regarding the thermal protection of the underlying component.

However, the introduction of the multilayer thermal protection ceramic coatings comes with two caveats:

i) The associated low fracture toughness of the fully stabilized ceramic upper coating, which impacts adversely its erosion resistance, ii) An inherited weak interface between ceramic lower coating and ceramic upper coating.

Regarding the erosion resistance of the ceramic coating system, the solution was to deposit both ceramic coatings, the lower coating partially stabilized and the upper coating fully stabilized, especially with a segmented microstructure.

A segmented microstructure is characterized by low porosity (<3%) and vertical cracks that travel along the coatings thickness, rendering it thermal compliant, which means the ceramic coating shows increased ability to absorb and withstand thermal strain. Typically, the vertical cracks will extend and continue from the lower coating to the upper coating. The dense segmented microstructure can increase the erosion resistance of the ceramic coatings at least three times.

Regarding the bonding capability of the two segmented ceramic coatings, the most important elements that influence that are surface roughness and temperature control. Regarding roughness, a segmented lower coating is in general rather smooth and the asperities or cavities that can assist with the mechanical interlocking are small or few. This can affect the robustness and the strength of the bond between the two ceramic coatings.

Concerning temperature, ideally a strong interface will appear when the upper stabilized coating will be deposited on an intensely preheated lower coating. High temperature will help with the wetting and spreading of the incoming fully stabilized particles on the partially stabilized lower coating. The particles will spread evenly and fill almost all cavities and asperities improving in this manner the mechanical interlocking between the two coatings.

However, homogeneous preheating for bulky components with complex geometries and varying metallic wall thickness can be challenging.

SUMMARY OF INVENTION

It is therefore an aim of the invention to improve the problem listed above.

The problem is solved by a component according to the independent claim.

In the dependent claims further advantages are listed which can be arbitrarily combined with each other to yield further advantages.

The figure shows an inventive ceramic coating system of a component.

A coating is usually applied by a spray torch passing over the same surface several times by applying powder in layers.

The current invention improves the strength and robustness of the interface interlocking and bonding between two ceramic coatings. The manner it does that, is through achieving higher roughness on a ceramic lower coating, without sacrificing its microstructure.

That can be achieved as following:

Typically, the ceramic lower coating 10 is sprayed by using a finer particle powder, especially using a powder cut, in order to achieve maximum melting degree, which in turn reduces the porosity and promotes the vertical crack appearance. The reason for the smooth surface of the coating is the almost complete melting of the powder particles that resemble pancakes when they are deposited.

Usage of coarser grain sizes particles, especially >45 um will reduce their melting degree, possibly increase the inherent porosity in the coating and thus reduce the population of vertical cracks per unit of length and ultimately the thermal compliance of the coating.

The solution to that, is to adopt a “flash” coating approach. That means to deposit a rough thin coating intermediated between the lower coating and the upper coating. That can be achieved with two methods:

1. Change of the spraying parameters of the lower coating 10 during the last pass(es):

By adopting colder parameters during the last pass(es) the melting degree of the fine particles is significantly reduced and the particles are deposited semimolten and not as flatten pancakes. That will increase significantly the roughness without affecting the microstructure of the lower coating.

2. Change of the powder for the last pass(es) of the ceramic lower coating 10. The powder can be changed and replaced by coarser particles (especially >45 um) in order to deposit the last pass(es) of the ceramic lower coating.

Essentially, the resulting ceramic coating system 16 will comprise of the following:

a) partial stabilized Zirconia (PSZ) as ceramic lower coating 10 sprayed with fine powder on a substrate 4 or metallic bond coat 7 having a surface 20, b) a thin coating of partial stabilized Zirconia sprayed in the middle (ceramic intermediate coating 11) with a rougher surface 19, c) fully stabilized Zirconia (FSZ) as ceramic upper coating 13 sprayed with fine powder; the upper coating 13 represents the outer surface 23.

The present invention comes to improve the robustness of a bilayer ceramic coating system 16, which is especially segmented.

Experience has shown the importance of temperature control during the spraying of bilayer ceramic coating systems 16 and temperature control can be rather challenging during the spraying of large components. With the introduction of a rough surface 19 between the two especially segmented coatings 10, 13, the sensitivity of the ceramic coating system 16 to temperature is decreased providing an overall more robust ceramic coating system. The adoption of both approaches described above is rather easy and both can be easily incorporated in the spraying sequence of the components.

BRIEF DESCRIPTION OF THE DRAWINGS

The figure shows an inventive component 1.

DETAILED DESCRIPTION OF INVENTION

The component 1 has especially a metallic substrate 4, which is preferably a nickel or cobalt based superalloy.

On the metallic substrate 4 there is a metallic bond coat 7, especially on a NiCoCrAl base, means NiCoCrAlY, NiCoCrAlYSi, NiCoCrAlYRe, NiCoCrAlYTa, . . . .

On top of the metallic bond coat 7 there is the ceramic coating system 16 as described above: a PSZ segmented lower coating 10, a PSZ segmented intermediate coating 11, a FSZ segmented upper coating 13.

The invention claimed is:

1. A component, comprising:
a substrate comprising a nickel- or cobalt-based superalloy;
a metallic bond coat; and
a ceramic coating system comprising:
a lower ceramic coating and an upper ceramic coating,
an intermediate ceramic coating located between the lower ceramic coating and the upper ceramic coating, comprising a rougher surface than an upper surface of the lower ceramic coating, and comprising a maximum thickness of 25% of a thickness of the lower ceramic coating or of the upper ceramic coating, and
wherein the intermediate ceramic coating comprises a porosity greater than a porosity of the lower ceramic coating.

2. The component according to claim 1,
wherein the lower ceramic coating reveals a finer microstructure than the upper ceramic coating.

3. The component according to claim 1,
wherein the lower ceramic coating is a partially stabilized Zirconia based coating.

4. The component according to claim 1,
wherein the intermediate ceramic coating is a partially stabilized Zirconia based coating.

5. The component according to claim 1,
wherein the upper ceramic coating is a fully stabilized Zirconia based coating.

6. The component of claim 1,
wherein the metallic bond coat is based on a NiCoCrAl composition.

7. The component according to claim 3,
wherein the lower ceramic coating is segmented.

8. The component according to claim 4,
wherein the intermediate ceramic coating is segmented.

9. The component according to claim 5,
wherein the upper ceramic coating is segmented.

10. The component according to claim 1,
wherein the lower ceramic coating is disposed on the metallic bond coat;
wherein the intermediate ceramic coating is disposed on the lower ceramic coating; and
wherein the upper ceramic coating is disposed on the upper surface of the intermediate ceramic coating.

11. The component according to claim 10,
wherein the ceramic coating system is free of any intervening coatings between the intermediate ceramic coating and the upper ceramic coating.

12. The component according to claim 10,
wherein the intermediate ceramic coating comprises a maximum thickness of 25% of a maximum thickness of the upper ceramic coating.

13. The component according to claim 10,
wherein the lower ceramic coating comprises a partially stabilized Zirconia based coating;
wherein the lower ceramic coating comprises a segmented structure; and
wherein the lower ceramic coating comprises a finer microstructure than the upper ceramic coating.

14. A component, comprising:
a substrate;
a metallic bond coat based on a NiCoCrAl composition; and
a ceramic coating system comprising:
a lower ceramic coating and an upper ceramic coating,
an intermediate ceramic coating located between the lower ceramic coating and the upper ceramic coating, comprising a rougher surface than an upper surface of the lower ceramic coating, and comprising a maximum thickness of 25% of a thickness of the lower ceramic coating or of the upper ceramic coating, and
wherein the intermediate ceramic coating comprises a porosity greater than a porosity of the lower ceramic coating.

15. A method to produce the component according to claim 1, comprising:
spraying the lower ceramic coating in order to achieve maximum melting degree, depositing the intermediate ceramic coating:
either by changing spraying parameters of the lower ceramic coating during last pass(es) by adopting colder parameters during the last pass(es) which reduces a melting degree of particles significantly and particles are deposited semimolten and not as flattened pancakes, leading to an increase significantly in roughness, or
by changing powder for the last pass(es) of the lower ceramic coating by replacing it with coarser particles in order to deposit the last pass(es) on the intermediate ceramic coating onto the lower ceramic coating, and
finally spraying a fully stabilized upper ceramic coating sprayed with fine powder.

16. The method of claim 15,
wherein spraying the lower ceramic coating comprises using a fine particles powder.

17. The method of claim 15,
wherein the coarser particles are larger than 45 μm.

18. The method of claim 15, wherein the lower ceramic coating is a partially stabilized Zirconia based coating; and/or wherein the intermediate ceramic coating is a partially stabilized Zirconia based coating; and/or wherein the upper ceramic coating is a partially stabilized Zirconia based coating.

19. The method of claim 18, wherein the lower ceramic coating is segmented; and/or wherein the intermediate ceramic coating is segmented; and/or wherein the upper ceramic coating is segmented.

* * * * *